Jan. 9, 1923.

P. W. DALRYMPLE.
ENDLESS TRACK VEHICLE.
FILED APR. 15, 1922.

P. W. DALRYMPLE.
ENDLESS TRACK VEHICLE.
FILED APR. 15, 1922.

Inventor
Philip W. Dalrymple
By his Attorneys
Baldwin Wight

Patented Jan. 9, 1923.

1,441,405

UNITED STATES PATENT OFFICE.

PHILIP W. DALRYMPLE, OF BALTIMORE, MARYLAND, ASSIGNOR TO LEWIS K. DAVIS, OF WASHINGTON, DISTRICT OF COLUMBIA.

ENDLESS-TRACK VEHICLE.

Application filed April 15, 1922. Serial No. 552,899.

*To all whom it may concern:*

Be it known that I, PHILIP W. DALRYMPLE, a citizen of the United States, and residing at Baltimore, in the State of Maryland, have invented certain new and useful Improvements in Endless-Track Vehicles, of which the following is a specification.

My invention relates to endless track vehicles of the type in which a rope or cable suspension is employed, and an object thereof is to provide means whereby the cables may be kept under the proper tension.

Another object of the invention is to provide means whereby the length of the cables may be separately adjusted as desired.

Other objects will be apparent from the following detailed description and the appended claims.

Figure 1:
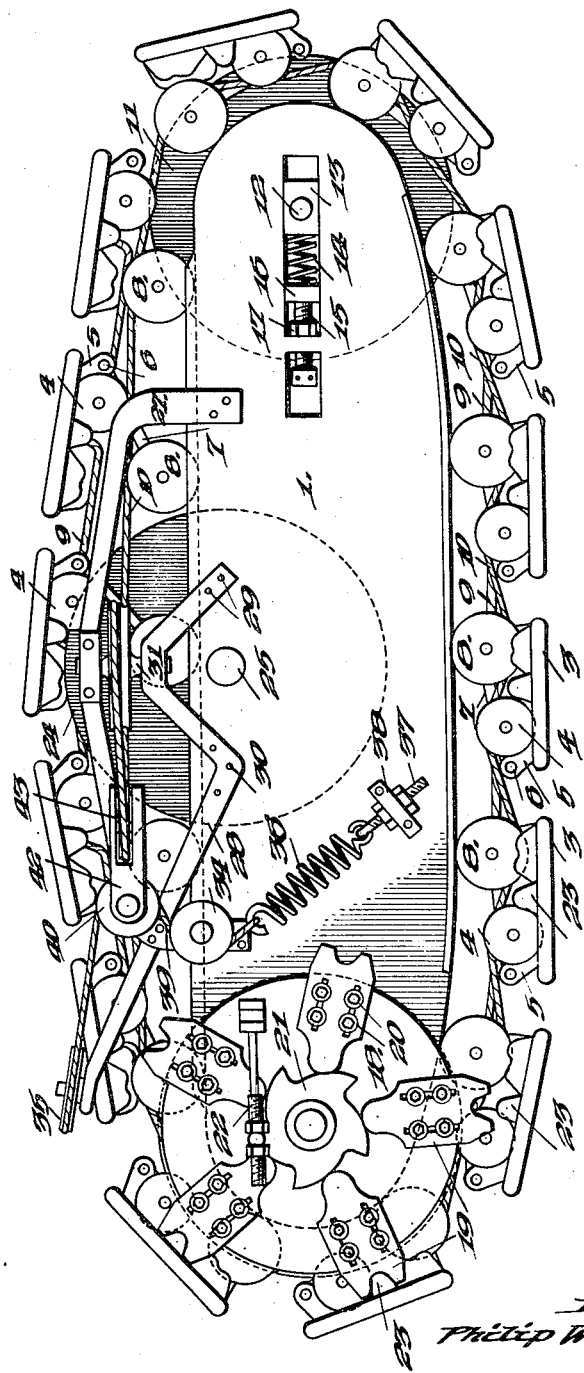
Figure 1 is a side elevation of my invention.
Figure 2:
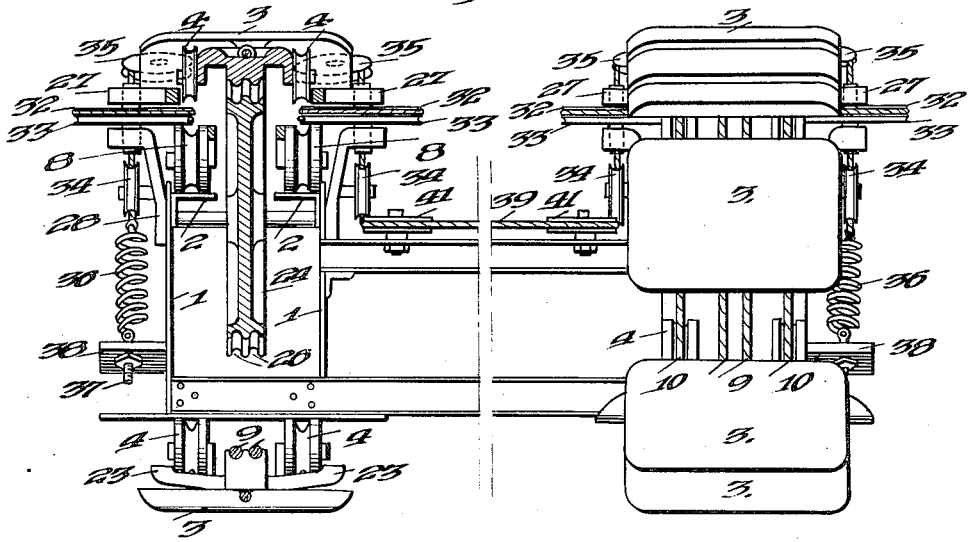
Figure 2 is a transverse view, the right hand portion being in elevation and the left hand portion in section.

Each side of the vehicle is provided with a pair of vertical plates 1 of horizontally elongated shape the edges of which are provided with angle irons 2 (see Figure 2) forming tracks. The edges of the plates themselves may form tracks as shown in my Patent 1,347,253, July 20, 1920. Track shoes or feet 3 are provided with two pulleys 4 on each shoe. Ears 5 on each shoe have pivoted thereto at 6 links 7 which carry pulleys 8 each preferably consisting of a pulley between two wheels at their free ends. These pulleys run on the tracks 2 and may be grooved to fit ridges on said tracks.

An endless cable 9 is connected to each track shoe in any usual or desired manner whereby an endless track member is formed and the shoes are maintained properly spaced. Another endless cable 10 passes over the pulleys 4 and under the pulleys 8 forming a cable suspension for the track. Any movement of one track shoe due to irregularity of the surface over which the vehicle is passing will be distributed among the other shoes in a manner well known in the art.

The endless track member passes over a wheel 11 at one end of the plates 1, the axle 12 of which is carried by an adjustable sliding block 13. A spring 14 tends to press this block in one direction, and the strength of the spring may be varied by an adjustable bolt 15 engaging a follower 16 that presses against the spring. The bolt is held in position by a lock nut 17 threaded thereon.

At the other end of the vehicle the endless track member passes over a double sprocket wheel 18. This wheel is provided with adjustable sprocket teeth 19 held in adjusted position by bolts 20 or other suitable devices. A cam member 21 on the wheel is adjusted by a screw 22, and this cam member has portions engaging each sprocket tooth, so that all of the teeth can be adjusted simultaneously by an adjustment of the screw 22. The purpose of the radial adjustment of the sprocket teeth is to change the circumferential pitch of the sprocket wheel when such change is necessary or desirable. Each track shoe is provided with lugs 23 adapted to engage the teeth of the sprocket wheel.

Mounted near the center of the vehicle and between the tracks 2 at the upper side of the plates 1 is a wheel 24 which turns on an axle 25. The edge of this wheel is grooved as shown at 26 to engage the cables 9 which connect the track shoes, these cables usually being double as clearly shown in Figure 2. As the track member passes over the upper side of the guideway or plates 1, the cables 9 and shoes pass over the wheel 24 and the cable 10 no longer engages the pulleys 4. The separation of the parts is permitted by the mounting of the pulleys 8 on the links 7 as above described.

Obviously the length or tension of the cables 9 can be adjusted by means of the wheel 11 or the sprocket teeth 19, but other means must be provided for placing the proper tension upon the cables 10. This is done in the following manner. On the side of each plate 1 are mounted two supporting members shown in the form of strips. One member 27 is fastened at both ends to the plate 1, while the other member 28 is fastened at one end 29 and at an intermediate point 30 to the plate 1, the other end being free. At an intermediate point a vertical axle 31 is supported in the members 27 and 28, and two pulleys 32 and 33 are mounted on this axle. A pulley 34 is mounted near one end of the member 27 and a pulley 35 near the free end of the member 28. A spring 36 has one end hooked into the eye of a bolt 37 adjustably mounted in a lug 38 on the plate 1, and the other end engages a cable 39 which passes around the pulley 34, a floating pulley 40, the pulley 35, to the other side of the track around the corresponding pulleys 35, 40 and 34, and finally around the pulley 41 (Figure 2) to the other side of the machine where the mechanism is duplicated.

The floating pulley 40 carries a block 42 in which is mounted a pulley 43 at right angles to the pulley 40. Following the cable 10 from the right hand side of the top stretch of the endless member toward the left, this cable passes around the pulley 33, the pulley 43, back to the pulley 32 and around this to the left where it again contacts with the pulleys 4 and 8 in the usual manner. It is obvious that a variation of the tension of the spring 36 will, through the cable 39, place a varying tension on the floating pulley 40 around which the cable 10 passes, and will thus vary the tension of this cable. Furthermore any sudden strain on this cable will be cushioned by the springs 36. As clearly shown in Figure 2, there are two cables 10 on each side of the machine, and each has its pulleys 32, 33 and 43. There is, however, a single spring 36 at each side of the machine, and a single cable 39 suffices to tension all four of the cables 10.

Figure 3:
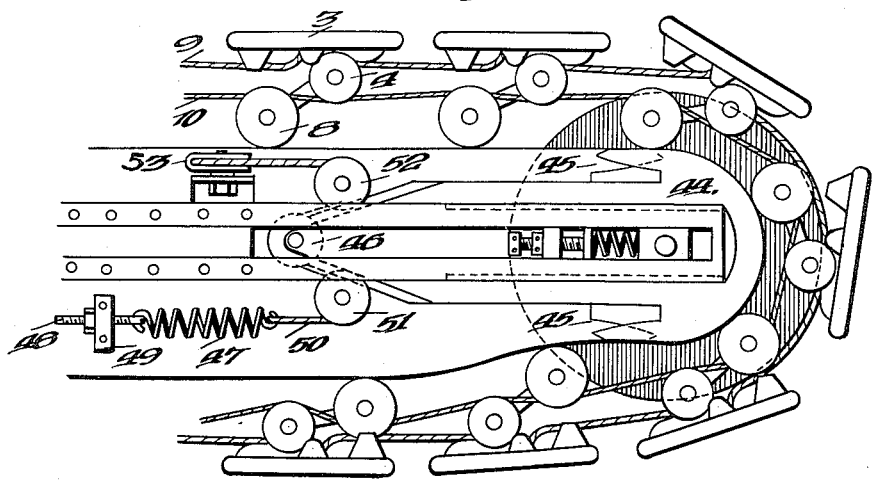
Figure 3 is a side elevation of a modification.

Figure 3 discloses a modified manner of varying the length of the track or the tension on the cables. The track itself is the same as in the form above described, but the front end of the track is carried on a slide 44 which can be moved in and out. The joints between the adjustable front and the main part of the track may be dove tail joints 45 or any equivalent form which will permit the sliding movement. A pulley 46 is mounted at the rear of the adjustable section. A spring 47 has one end connected to a bolt 48 adjustable in a lug 49 carried by the side plate 1, and at its other end is connected to a cable 50 which passes around the pulleys 51, 46, 52 and 53, and may have its other end fixed to the frame or passing to similar mechanism at the other side of the vehicle. Obviously varying the tension of the spring 47 will tend to move the sliding block 44 and thus vary the tension on the track.

It will be obvious that a very flexible track system is provided in which the length of the cables may be varied and the amount of tension placed on the suspension cable may also be readily regulated. Detail changes will occur to any one skilled in the art, and it is understood that the invention is to be regarded as limited only by the scope of the following claims.

I claim as my invention:

1. Endless track mechanism for vehicles comprising an endless track member, rollers carried thereby, a series of links also carried by the track member and supporting a second series of rollers at their free ends, an endless suspension cable passing between the two series of rollers and normally engaging both, and means for separating the two series of rollers on the upper stretch of the track and moving both series and the cable out of contact.

2. Endless track mechanism for vehicles comprising an endless track member, rollers carried thereby, a second series of rollers supported from the endless track and normally running on a guideway, an endless suspension cable passing between the two series of rollers and normally engaging both, and means including a wheel about which the upper stretch of track runs to separate the two series of rollers and disengage both series and the cable.

3. Endless track mechanism for vehicles comprising an endless track member, rollers carried thereby, a second series of rollers supported from the endless track and normally running on a guideway, an endless suspension cable passing between the two series of rollers and normally engaging both, means including a wheel about which the upper stretch of track runs to separate the two series of rollers and disengage both series and the cable, and means for applying tension to the suspension cable when the rollers are separated.

4. Endless track mechanism for vehicles comprising a series of track units, cables connecting the same, rollers carried by the track units, links also carried by the track units and supporting a second series of rollers at their free ends which run on a guide way, an endless suspension cable passing between the two series of rollers and normally engaging both, means for separating the two series of rollers on the upper stretch of the track, and means for applying tension to said endless suspension cable.

5. Endless track mechanism for vehicles comprising a series of track units, cables connecting the same, rollers carried by the track units, links also carried by the track units and supporting a second series of rollers at their free ends which run on a guideway, an endless suspension cable passing between the two series of rollers and normally engaging both, means for separating the two series of rollers on the upper stretch of the track, a floating pulley about which the upper stretch of the suspension cable passes, and means for applying tension to the endless suspension cable through the floating pulley.

6. In endless track mechanism for vehicles which includes an endless suspension cable, means for varying the tension thereon comprising two pulleys on a common axis, a floating pulley, a block carried thereby, a guiding pulley carried by the block, said cable passing around one of the first named pulleys, thence around the guiding pulley and the second of the first named pulleys, and means for varying the tension on the floating pulley.

7. In endless track mechanism for vehicles which includes an endless suspension cable, means for varying the tension thereon comprising two pulleys on a common axis, a floating pulley, a block carried thereby, a guiding pulley carried by the block, said cable passing around one of the first named pulleys, thence around the guiding pulley and the second of the first named pulleys, and means for varying the tension on the floating pulley, comprising an adjustable spring anchored to the frame, a cable attached to one end thereof and passing around the floating pulley.

8. In endless track mechanism for vehicles which includes an endless suspension cable, means for varying the tension thereon comprising two pulleys on a common axis, a floating pulley, a block carried thereby, a guiding pulley carried by the block, said cable passing around one of the first named pulleys, thence around the guiding pulley and the second of the first named pulleys, and means for varying the tension on the floating pulley, comprising an adjustable spring anchored to the frame, a cable attached to one end thereof and passing around the floating pulley, the other end of the cable passing around similar mechanism on the other side of the machine and attached to a similar spring.

In testimony whereof, I have hereunto subscribed my name.

PHILIP W. DALRYMPLE.